United States Patent [19]

Shiiki et al.

[11] Patent Number: 4,631,612
[45] Date of Patent: Dec. 23, 1986

[54] MAGNETIC RECORDING AND REPRODUCING SYSTEM

[76] Inventors: Kazuo Shiiki, 2644-6, Kawashiri, Shiroyama-cho, Tsukui-gun, Kanagawa-ken; Yoshihiro Shiroishi, 2-32-A101, Koyasu-cho, Hachioji-shi, Tokyo; Isamu Yuito, 3-413, Chigase-machi, Ohme-shi, Tokyo; Kiminari Shinagawa, 3603-2, Kawashiri, Shiroyama-cho, Tsukui-gun, Kanagawa-ken; Yasutaro Uesaka, 3-17-40, Tokura, Kokubunji-shi, Tokyo; Hideo Fujiwara, 1272-50, Shimotomi, Tokorozawa-shi, Saitama-ken; Hitoshi Nakamura, 3-24-19, Higashi-ohme, Ohme-shi, Tokyo, all of Japan

[21] Appl. No.: 513,615

[22] Filed: Jul. 14, 1983

[30] Foreign Application Priority Data

Jul. 14, 1982 [JP] Japan ................................. 57-121117

[51] Int. Cl.⁴ .............................................. G11B 5/127
[52] U.S. Cl. .................... 360/125; 360/122; 360/132
[58] Field of Search ............... 360/122, 125, 113, 126, 360/127, 132

[56] References Cited

U.S. PATENT DOCUMENTS

| | | | |
|---|---|---|---|
| 3,152,225 | 10/1964 | Peters | 360/119 |
| 4,138,702 | 2/1979 | Magnenet | 360/125 |
| 4,251,842 | 2/1981 | Iwasaki et al. | 360/134 |
| 4,317,148 | 2/1982 | Chi | 360/119 |
| 4,423,450 | 12/1983 | Hamilton | 360/111 |
| 4,441,131 | 4/1984 | Osanai | 360/122 |
| 4,442,159 | 4/1984 | Dezawa et al. | 360/134 |

FOREIGN PATENT DOCUMENTS

| | | | |
|---|---|---|---|
| 57-55522 | 4/1982 | Japan | 360/122 |
| 57-74823 | 5/1982 | Japan | 360/113 |

*Primary Examiner*—John H. Wolff
*Assistant Examiner*—Matthew J. Bussan
*Attorney, Agent, or Firm*—Antonelli, Terry & Wands

[57] ABSTRACT

A magnetic recording and reproducing system comprising (i) a magnetic head including a first magnetic pole whose saturation flux density is at least 7 kG and whose edge face is 0.15–0.5 μm thick, and a second magnetic pole which lies on the same side as the first magnetic pole with respect to a recording medium and whose edge face is at least 10 times thicker than that of the first magnetic pole, and (ii) the perpendicular magnetic recording medium including a perpendicular magnetization layer which has a coercive force of 250–600 Oe. in a direction perpendicular to a plane thereof and which is 0.1–0.5 μm thick.

9 Claims, 8 Drawing Figures

MAGNETIC RECORDING AND REPRODUCING SYSTEM

BACKGROUND OF THE INVENTION

The present invention relates to a magnetic recording and reproducing system in magnetic disk apparatus, video tape recorders, etc., and more particularly to a magnetic head—medium system for perpendicular magnetic recording suited to high density magnetic recording.

A conventional magnetic recording system has been such that, using a ring type magnetic head, magnetization is caused to remain in the planar direction of a magnetic recording medium so as to record a signal. With this system, however, a demagnetizing field in the medium increases with enhancement in the density of the recording, and the recording density is limited by itself. On the other hand, the perpendicular magnetic recording which utilizes a magnetization perpendicular to the plane of a magnetic recording medium has recently been proposed. This system has come into the limelight as a system wherein the demagnetizing field in the medium approaches zero with enhancement in the recording density. Regarding the perpendicular magnetic recording system, the principle has already been proposed, and excellent short wavelength characteristics, that is, the possibility of high density recording have been demonstrated.

FIG. 1 is a diagram typically showing the combination of a magnetic head 1 and a medium 2 in an example of a hitherto-known perpendicular magnetic recording system which adopts a closed magnetic path structure and which is considered the most efficient. Numeral 11 designates a first magnetic pole for recording and reproduction, numeral 12 a coil for causing a signal current to flow therethrough, and numeral 13 a second magnetic pole for forming a closed magnetic path. In addition, numeral 21 indicates a magnetic recording medium layer having perpendicular magnetic anisotropy (hereinbelow, termed "perpendicular magnetization layer"), and numeral 22 indicates a high magnetic permeability layer for forming the closed magnetic path.

Merely with such principle proposal, however, a high density recording cannot always be realized at a practicable level. In the perpendicular magnetic recording system as described above, there has not been an instructive principle which concretely teaches the magnetic characteristics and geometries of the respective magnetic poles and perpendicular magnetization layer for obtaining satisfactory results, and the respective magnetic characteristics and dimensions have been combined without a definite plan. Needless to say, a favorable result is not always obtained under such situation.

For example, the dimensions of the first magnetic pole concern the recording density characteristic, and a high recording density cannot always be realized merely by fabricating the magnetic head of the structure shown in FIG. 1. In practical use, the perpendicular magnetic recording system is also required to have recording and reproducing efficiencies nearly equal to those of the conventional recording system and to be usable up to a high frequency band. The principle proposal as shown in FIG. 1 does not satisfy the requirements fully.

The following references are cited to show the state of the art; (i) U.S. Pat. No. 3,120,001, (ii) Japanese Laid-open Patent Application No. 52-55513, and (iii) Japanese Laid-open Patent Application No. 55-8690.

SUMMARY OF THE INVENTION

An object of the present invention is to optimize a magnetic head and a recording medium for a perpendicular magnetic recording system and to provide a practicable magnetic recording and reproducing system having excellent efficiencies of read-write characteristics and favorable high frequency characteristics.

The inventors of the present invention have found out that a practicable high-density recording and reproducing apparatus can be realized only when the dimensions and magnetic characteristics of a magnetic head and a recording medium are set within certain limits peculiar to the perpendicular magnetic recording system.

In the present invention, the dimensions and magnetic characteristics of a magnetic head and a recording medium have been optimized so as to render the magnetic field distribution of the magnetic head abrupt, thereby to achieve a high recording density and to simultaneously realize high efficiencies of read-write characteristics. In addition, in case of using the recording and reproducing system in a high frequency band, the object can be accomplished when the magnetic head is provided by a thin film magnetic head which is fabricated by the use of a photolithographic technique etc.

In order to accomplish the object, the magnetic recording and reproducing system of the present invention comprises (i) a perpendicular magnetic recording and reproducing head in which a first magnetic pole for magnetic recording and reproduction is made of a magnetic material having a saturation flux density of at least 7 kG, and an edge face of the first magnetic pole confronting a recording medium is 0.15–0.5 $\mu$m thick, and more preferably, 0.2–0.3 $\mu$m thick while an edge face of a second magnetic pole confronting the recording medium, the second magnetic pole lying on the same side as the first magnetic pole with respect to the recording medium, is at least 5 times and, more preferably, at least 10 times thicker than the first magnetic pole, and (ii) the perpendicular magnetic recording medium with a magnetic thin film which is formed on a magnetic layer of high magnetic permeability directly or through an intermediate layer, which has an easy magnetization axis in a direction perpendicular to the plane of the film, whose thickness is 0.1–0.5 $\mu$m and whose coercive force in the direction perpendicular to the film plane is 250–600 Oe.

When an Mn—Zn ferrite single crystal is used as a magnetic material for forming the second magnetic pole, the fabricating process of the magnetic head can be simplified. As the perpendicular magnetization layer, a Co—Cr alloy is usually used at present, but it is not restrictive.

DESCRIPTION OF THE PRESENTLY PREFERRED EMBODIMENTS

The present invention will now be described in more detail in connection with the following embodiments.

Figure 1:
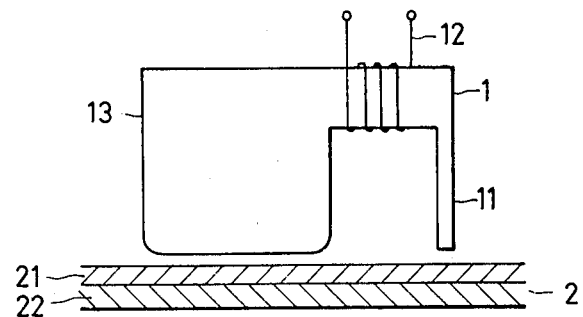
FIG. 1 is a schematic sectional view for illustrating a perpendicular magnetic recording system.
Figure 2:
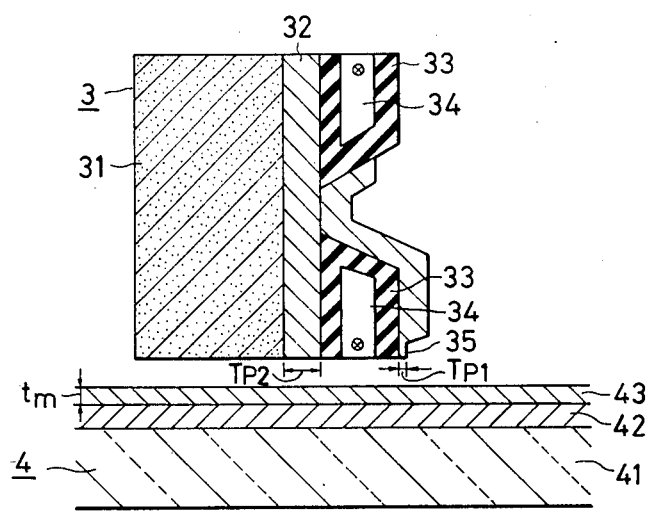
FIG. 2 is a sectional view of a magnetic head—medium system illustrating an embodiment of the present invention.

FIG. 2 is a schematic sectional view of a thin film magnetic head—recording medium system typically illustrated for describing the present invention. The essential portions of the thin film magnetic head 3 will be described below. On a substrate 31 made of "Photoceram" (trade name of Corning Glass Works in U.S.A.), each of various Co-based amorphous ferromagnetic alloys having unequal saturation flux densities $B_{s2}$, for example, $Co_{76}Cr_{12}Zr_{12}$, $Co_{84}Cr_8Zr_8$ and $Co_{86}Mo_7Zr_7$ (hereinbelow, numerals in composition formulas shall indicate at.%) were deposited at various thicknesses $T_{p2}$ by the sputtering process, to form a magnetic pole 32 which corresponds to the second magnetic pole 13 for forming the closed magnetic path as shown in FIG. 1. As will be described hereinafter, when a ferromagnetic material such as Mn—Zn ferrite is used as the substrate, this magnetic pole for forming the closed magnetic path can serve also as the substrate. Numeral 33 indicates an insulator layer or $SiO_2$ (deposited by the sputtering process) which functions to magnetically and electrically isolate a first magnetic pole 35 for writing and reading, the second magnetic pole 32 for forming the closed magnetic path, and a coil 34 which is an Al coil (a coil of one turn deposited by the evaporation process and patterned by the photolithographic process) that functions to cause a signal current to flow therethrough. The thickness of the whole $SiO_2$ insulator layer (that is, the total of the thickness of the $SiO_2$ layer on the upper surface side of the Al coil and the thickness thereof on the lower surface side) was made about 3 μm, while the thickness of the Al coil was made about 1.5 μm and the width thereof about 50 μm. The dimensions and materials of the coil and insulator layer do not especially specify the present invention, but they may be selected in consideration of ease in the fabrication of the head.

Shown at numeral 35 is the first magnetic pole for writing and reading. Here, as the various materials of unequal saturation flux densities $B_{s1}$, Co-based amorphous alloys ($Co_{80}Mo_{9.5}Zr_{10.5}$ etc.), Ni—Fe polycrystalline alloys (Ni—19 wt.% Fe etc.) and Fe—Si polycrystalline alloys (Fe—6.5 wt.% Si etc.) were deposited and formed by the sputtering process (the magnetic permeabilities of all the materials at a frequency of 1 MHz were at least about 1,000). The heads were fabricated under the condition that, in the first magnetic pole 35, the thickness $T_{p1}$ thereof at the edge face confronting the recording medium was varied over 0.1–3 μm, whereas the thickness of the part other than the edge face was held constant at 3 μm. In actuality, the thin film head is fabricated by hitherto-known techniques such as sputtering, evaporation, photolithography, cutting and polishing. Such fabricating methods are well-known techniques, and shall not be described in detail.

Next, the construction of the recording medium 4 will be explained. On a glass substrate 41, each of Co—Mo—Zr amorphous alloys ($Co_{80}Mo_{9.5}Zr_{10.5}$ etc.) 42 was formed as a layer of high magnetic permeability to a thickness of about 1 82 m by the sputtering process (the magnetic permeability at a frequency of 1 MHz was about 1,000). Further, on the high permeability layer, each of Co—Cr polycrystalline alloys (Co—17 at.% Cr etc.) 43 was formed as a perpendicular magnetic recording medium by the sputtering process with its thickness $t_m$ varied. The coercive force $Hc_\perp$ of the Co—Cr medium in the perpendicular direction was varied by changing the substrate temperature during the sputtering. It is also possible to vary $Hc_\perp$ by the use of dopant elements such as Ta and Mo. The saturation magnetization of the fabricated media was about 200–700 emu/cc. As the perpendicular magnetic recording media, Co—Ru alloys, Co—W—P alloys and Co—Mn—P alloys are known as the Co—Cr alloys. Since, however, the alloys containing Co and Cr as their principal components are the greatest in the perpendicular magnetic anisotropy and the saturation magnetization and are easy to prepare, they are the most desirable at present in case of performing the present invention.

Various thin film magnetic heads and recording media were combined, and read-write characteristics were measured. The measurement was conducted at the optimum write current and at a relative speed of 2.5 m/s with the magnetic head and recording medium spaced by at most 0.05 μm.

Figure 3:
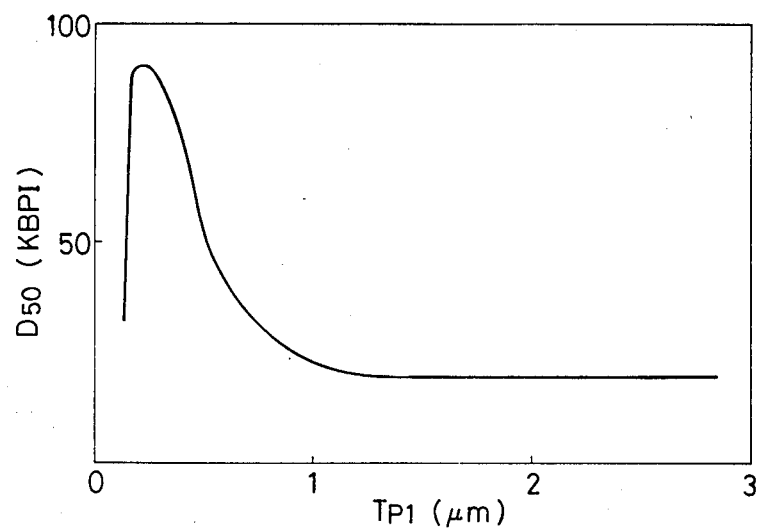
FIG. 3 is a graph showing the relationship between the thickness of the edge face of a first magnetic pole and the highest recording density.

FIG. 3 is a graph showing the variation of the highest recording density $D_{50}$ at the time at which the thickness $T_{p1}$ of the edge face of the first magnetic pole (Ni—19 wt.% Fe alloy film) was varied. Here, a $Co_{76}Cr_{12}Zr_{12}$ amorphous alloy was used as the material of the second magnetic pole. In this case, for the sake of convenience, the highest recording density which afforded an output of 50% of a read-write output at a sufficiently low recording density was used as the highest recording density $D_{50}$. As the dimensions and magnetic characteristics other than the thickness $T_{p1}$, typical values indicated in (a) of Table 1 were used. $D_{50}$ is great only in a narrow range in which $T_{p1}$ is 0.15 μm–0.5 μm. This is so interpreted that when $T_{p1}$ is great, the magnetic field distribution of the magnetic head will not become abrupt; whereas when $T_{p1}$ is small, saturation will take place magnetically, so a sufficient recording magnetic field will not develop.

Table 1 also contains data on examples to be described below.

TABLE 1

|  | (a) | (b) | (c) | (d) | (e) | (f) |
|---|---|---|---|---|---|---|
| $T_{p1}$ (μm) | — | 0.3 | 0.3 | 0.3 | 0.3 | 0.3 |
| $B_{s1}$ (kG) | 10 | — | 10 | 10 | 10 | 10 |
| $T_{p2}$ (μm) | 20 | 20 | — | 20 | 20 | 20 |
| $B_{s2}$ (kG) | 4 | 4 | 4 | — | 4 | 4 |
| $t_m$ (μm) | 0.2 | 0.2 | 0.2 | 0.2 | 0.2 | — |

TABLE 1-continued

| | (a) | (b) | (c) | (d) | (e) | (f) |
|---|---|---|---|---|---|---|
| $Hc_\perp$ (Oe) | 500 | 500 | 500 | 500 | — | 500 |

Figure 4:
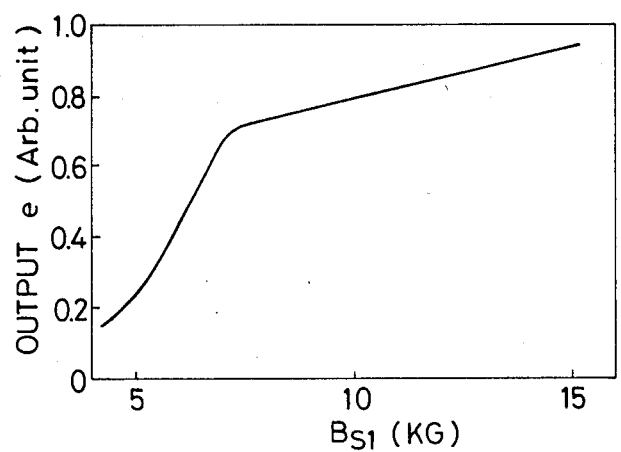
FIG. 4 is a graph showing the relationship between the saturation flux density of the first magnetic pole and the output.

FIG. 4 is a graph showing the output e at a recording density of 1 kBPI at the time at which the saturation flux density $Bs_1$ of the first magnetic pole was varied. As the dimensions and magnetic characteristics other than $Bs_1$, there were used typical values indicated in (b) of Table 1. e lowers as $Bs_1$ lowers, and it becomes extremely low for $Bs_1$ less than 7 kG. This signifies that the edge face of the first magnetic pole begins to be magnetically saturated, so a sufficient recording magnetic field cannot be established, and satisfactory recording is not performed on the medium. Such situation is undesirable as the magnetic head. In view of the result of FIG. 4, it is understood that the saturation flux density $Bs_1$ of the first magnetic pole needs to be at least 7 kG.

Figure 5:
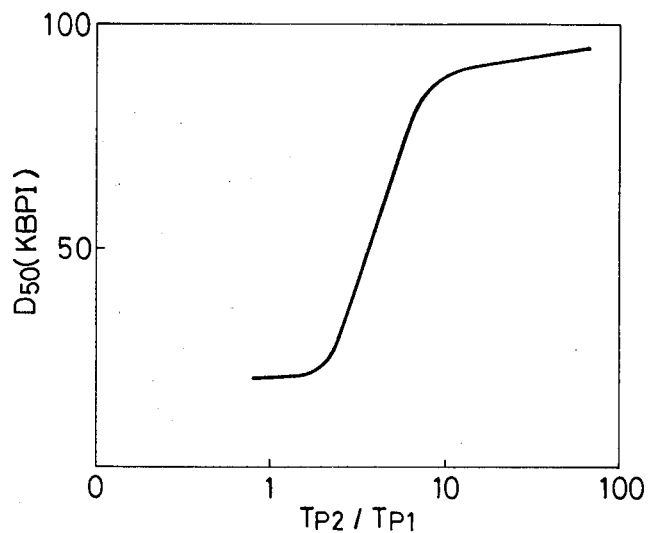
FIG. 5 is a graph showing the relationship between the thickness of a second magnetic pole and the highest recording density.

FIG. 5 is a graph showing the variation of the highest recording density $D_{50}$ versus the thickness $Tp_2$ of the second magnetic pole ($Co_{76}Cr_{12}Zr_{12}$). The axis of abscissas in FIG. 5 represents the thickness $Tp_2$ of the second magnetic pole as normalized with respect to the thickness $Tp_1$ of the first magnetic pole, that is, $Tp_2/Tp_1$, while the axis of ordinates represents the recording density $D_{50}$ which affords the output of 50% of the read-write output at the sufficiently low recording density. As the dimensions and magnetic characteristics other than $Tp_2$, typical values indicated in (c) of Table 1 were used. It is understood that unless $Tp_2$ is at least 5 times and, more preferably 10 times, greater than $Tp_1$, a sufficiently great $D_{50}$ is not attained. This is so interpreted that when $Tp_2$ is nearly equal to $Tp_1$, recording and reproduction will be performed also by the second magnetic pole. In accordance with this invention, the value of $D_{50}$ is over about 50 and is, preferably, about 90.

Figure 6:
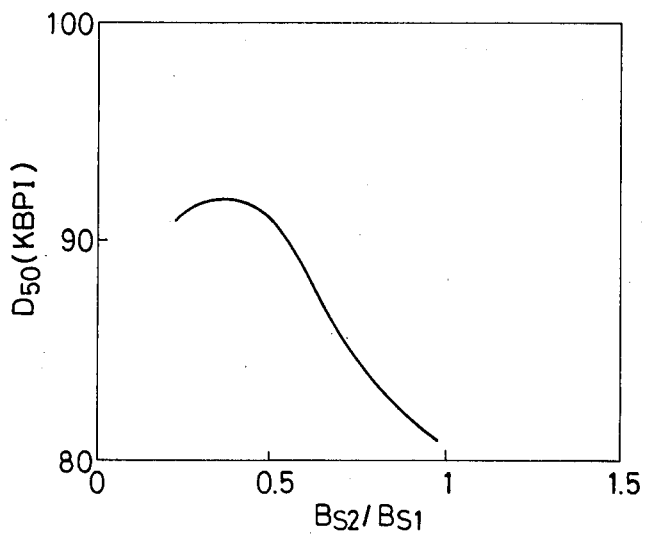
FIG. 6 is a graph showing the relationship between the saturation flux density of the second magnetic pole and the highest recording density.

FIG. 6 is a graph showing the variation of the highest recording density $D_{50}$ versus the saturation flux density $Bs_2$ of the second magnetic pole. The axis of abscissas in FIG. 6 represents the saturation flux density $Bs_2$ of the second magnetic pole as normalized with respect to the saturation flux density $Bs_1$ of the first magnetic pole, that is, $Bs_2/Bs_1$, while the axis or ordinates represents the recording density $D_{50}$ which affords the output equal to 50% of the read-write output at the sufficiently low recording density. As the dimensions and magnetic characteristics other than $Bs_2$, there were used typical values indicated in (d) of Table 1. It is more desirable to render $Bs_2$ at most $\frac{1}{2}$ of $Bs_1$. This is so interpreted that when the first magnetic pole and the second magnetic pole are equal, recording and reproduction will be performed also by the second magnetic pole. In general, a material of low saturation flux density has a low Curie temperature. When the Curie temperature is low, characteristics change greatly for a slight temperature change near the room temperature. Therefore, the value of $Bs_2$ needs to be determined in consideration of actual service conditions. Assuming that a Curie temperature of about 200° C. is required in practical use, $Bs_2$ becomes about 3 kG or above, though it depends also upon the kind of the material.

Figure 7:
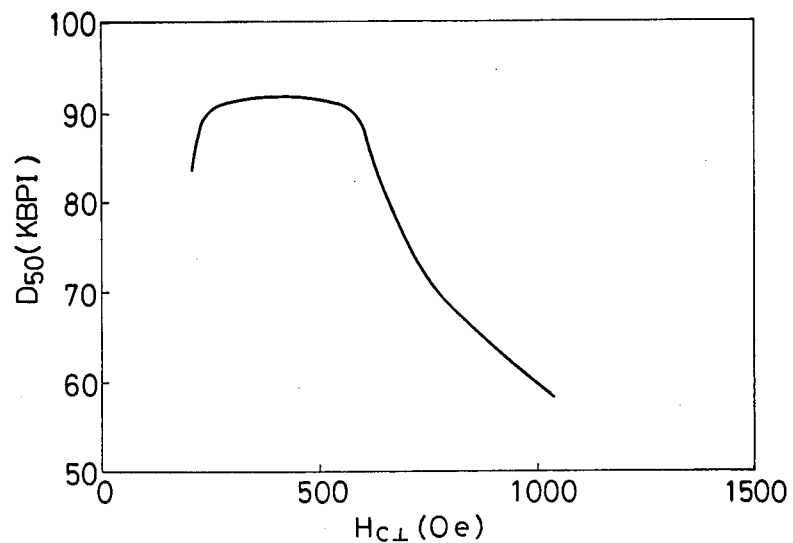
FIG. 7 is a graph showing the relationship between the coercive force in a direction perpendicular to the plane of a recording medium and the highest recording density.

FIG. 7 is a graph showing the variation of the highest recording density $D_{50}$ versus the perpendicular coercive force $Hc_\perp$ of the recording medium. As the dimensions and magnetic characteristics other than $Hc_\perp$, there were used typical values indicated in (e) of Table 1. Then $Hc_\perp$ is too great, $D_{50}$ decreases. In view of the saturation characteristic of the write current, this will not be ascribable to the magnetic saturation of the edge face of the head, but will be ascribable to any other cause. With the conventional longitudinal magnetic recording system, unless the edge face of a head is magnetically saturated, the recording density characteristic tends to lengthen with increase in the coercive force of a recording medium. Therefore, the above situation is thought an effect peculiar to the perpendicular magnetic recording system. When $Hc_\perp$ is too small, $D_{50}$ decreases. This is attributed to the fact that the magnetization cannot be caused to remain in the perpendicular direction. In case of the foregoing magnetic head of the present invention, high recording densities are attained at $Hc_\perp = 250-600$ Oe., though they somewhat depend upon differences in the dimensions and material characteristics of the various parts.

Figure 8:
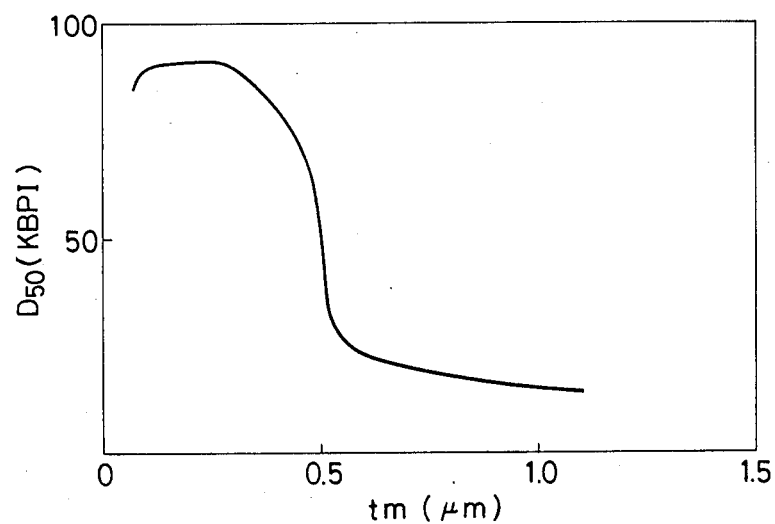
FIG. 8 is a graph showing the relationship between the thickness of a magnetic film having an axis of easy magnetization in the direction perpendicular to the plane of the recording medium and the highest recording density.

FIG. 8 is a graph showing the variation of the value of the highest recording density versus the thickness $t_m$ of the magnetic film having the axis of easy magnetization perpendicularly to the plane of the recording medium. As the dimensions and magnetic characteristics other than $t_m$, there were used typical values indicated in (f) of Table 1. When $t_m$ is great, $D_{50}$ decreases. This is so interpreted that increase in $t_m$ will result in spreading the magnetic field distribution within the recording medium. Also, when $t_m$ is small, $D_{50}$ decreases. This is so interpreted that when the magnetic film is thin, a satisfactory perpendicular magnetic anisotropy will not be attained. In general, when the medium is combined with the foregoing magnetic head of the present invention, its thickness $t_m$ needs to be 0.1-0.5 μm.

The thin film magnetic head and the recording medium thus far described produce favorable recording density characteristics for the first time when combined and used. Such favorable recording density characteristics are not exhibited when a conventional longitudinal magnetic recording medium is written and read by the use of the magnetic head of the present invention, or when contrariwise the magnetic recording medium of the present invention is written and read by the use of the conventional ring head for the longitudinal magnetic recording. For example, in case of combining the ring head with the perpendicular magnetic recording medium, the recording density characteristic tends to lengthen when the coercive force $Hc_\perp$ of the medium is as great as about 1,000 Oe or above, but it is inferior to that in the present invention. As stated before, it cannot be said that the perpendicular magnetic recording and reproduction of high recording density are possible whenever there are the hitherto-known perpendicular magnetic recording medium and perpendicular magnetic recording head proposed in principle. The high recording density characteristic can be achieved for the first time by optimizing the respective members and also optimizing the combination thereof.

According to the present invention, by forming the closed magnetic path, the efficiencies of read-write characteristics substantially equal to those in the conventional longitudinal magnetic recording can be attained, and a write current of several hundred mA.T or below and an output of about 40 $\mu V_{p-p}/T$ or above (for a track width of about 80 μm) are attained. Moreover, when the present invention is performed with the thin film magnetic head as stated in the embodiment, the inductance of the head is as very small as several tens nH (at 10 MHz) or below, and the head can be used up to a very high frequency band.

While, in the embodiment, the second magnetic pole for forming the closed magnetic path has been made of the Co-based amorphous magnetic alloy formed by the sputtering process, an insulator such as $SiO_2$ or $Al_2O_3$ may be interposed into several layers in the case of the usage for the high frequency band, whereby eddy current can be reduced to enhance the efficiencies still more. Needless to say, the materials and manufacturing methods mentioned in the embodiment are mere examples, and the present invention can rely on various materials and manufacturing methods having heretofore been known. By way of example, the glass substrate can be replaced by Al substrate, resin substrate, etc. and with a medium in the form of a tape. Particularly as the second magnetic pole of the magnetic head, a ferromagnetic substrate is also usable. In that case, the manufacturing process can be simplified. The substrate must be of a material which is favorable in hardness, wear resistance, surface roughness, etc. and which satisfies the conditions of the present invention described before. As such material, an Mn—Zn ferrite single crystal substrate is the most excellent.

The present invention can also be applied to usual head, or the bulk type head which is constructed by using no photolithographic technique.

Regarding items other than mentioned above, known techniques may be practiced.

What is claimed is:

1. A magnetic recording and reproducing system comprising a perpendicular magnetic recording and reproducing head and a perpendicular magnetic recording medium, said head having a first magnetic pole and a second magnetic pole, in which said first magnetic pole, for magnetic recording and reproduction, is made of a magnetic material having a saturation flux density of at least 7 kG, and an edge face of the first magnetic pole confronting the recording medium, is 0.15-0.5 μm thick, while an edge face of the second magnetic pole, confronting the recording medium, the second magnetic pole lying on the same side as the first magnetic pole with respect to the recording medium, is at least 5 times thicker than the first magnetic pole, and the perpendicular magnetic recording medium comprises a magnetic thin film which is formed on a magnetic layer of high magnetic permeability directly or through an intermediate layer, which magnetic thin film has an easy magnetization axis in a direction nearly perpendicular to the plane of the film, and which magnetic thin film has a thickness of 0.1-0.5 μm and a coercive force in the direction perpendicular to the film plane of 250-600 Oe.

2. A magnetic recording and reproducing system as defined in claim 1, wherein a magnetic material forming the second magnetic pole is an Mn—Zn ferrite single crystal.

3. A magnetic recording and reproducing system as defined in claim 1, wherein the magnetic thin film having the easy magnetization axis in the direction nearly perpendicular to the plane of said perpendicular magnetic recording medium is of an alloy which contains Co and Cr as its main components.

4. A magnetic recording and reproducing system as defined in claim 2, wherein the magnetic thin film having the easy magnetization axis in the direction nearly perpendicular to the plane of said perpendicular magnetic recording medium is of an alloy which contains Co and Cr as its main components.

5. A magnetic recording and reproducing system as defined in claim 1, wherein the edge face of the first magnetic pole is 0.2-0.3 μm thick and the edge face of the second magnetic pole is at least 10 times greater than the thickness of the edge face of the first magnetic pole.

6. A magnetic recording and reproducing system as defined in claim 1, wherein said head further comprises a coil for causing a signal current to flow therethrough and an insulator layer for magnetically and electrically isolating the first and second magnetic poles and said coil.

7. A magnetic recording and reproducing system as defined in claim 2, wherein the first magnetic pole is made of a material selected from the group consisting of Co amorphous alloys, Ni—Fe polycrystalline alloys, and Fe—Si polycrystalline alloys.

8. A magnetic recording and reproducing system as defined in claim 1, wherein the second magnetic pole is constructed of a plurality of layers, with insulator layers interposed between adjacent ones of the plurality of layers of the second magnetic pole.

9. A magnetic recording and reproducing system as defined in claim 8, wherein the insulator layers interposed between adjacent ones of the plurality of layers of the second magnetic pole are made of a material selected from the group consisting of $SiO_2$ and $Al_2O_3$.

* * * * *